US012558715B2

(12) United States Patent
Eubanks

(10) Patent No.: US 12,558,715 B2
(45) Date of Patent: Feb. 24, 2026

(54) AUTOMATED BUCKET CLEANING SYSTEM

(71) Applicant: JAMES DALLAS DESIGNS, LLC, St. Petersburg, FL (US)

(72) Inventor: James D. Eubanks, St. Petersburg, FL (US)

(73) Assignee: JAMES DALLAS DESIGNS, LLC, St. Petersburg, FL (US)

(*) Notice: Subject to any disclaimer, the term of this patent is extended or adjusted under 35 U.S.C. 154(b) by 20 days.

(21) Appl. No.: 18/674,862

(22) Filed: May 26, 2024

(65) Prior Publication Data

US 2025/0360545 A1 Nov. 27, 2025

(51) Int. Cl.

*B08B 13/00* (2006.01)
*B08B 9/28* (2006.01)
*B08B 9/36* (2006.01)

(52) U.S. Cl.

CPC .................. *B08B 9/28* (2013.01); *B08B 9/36* (2013.01); *B08B 2209/08* (2013.01)

(58) Field of Classification Search

None

See application file for complete search history.

(56) References Cited

U.S. PATENT DOCUMENTS 1,111,357 A * 9/1914 Brant ...................... A47L 13/58 15/264
3,343,555 A * 9/1967 Kasner .................... B08B 3/006 134/182
4,089,080 A * 5/1978 Beer ....................... B08B 9/087 15/56

FOREIGN PATENT DOCUMENTS

CN 210230925 U * 4/2020

OTHER PUBLICATIONS

Google Patents translation of CN210230925U (Year: 2025).*

* cited by examiner

*Primary Examiner* — Eric W Golightly

(74) *Attorney, Agent, or Firm* — Larson & Larson; Frank Liebnow

(57) ABSTRACT

A system for cleaning buckets includes a cleaning mixture dispenser that includes a source of flowing water interfaced to a foot-operated valve such that operation of the foot-operated valve causes water to flow mixed with a cleaning fluid for placement into the bucket. A washing station has a brush for abrading an inside surface of the bucket that is interfaced to a motor that is controlled by a foot-operated switch. A rinsing fountain for spraying water over the inside surface of the bucket is interfaced to the source of flowing water through a second foot-operated valve such that operation of the second foot-operated valve causes water to flow through a rinse fountain feed tube and out of the rinse fountain head through orifices in the rinse fountain head for spraying onto the inside surfaces of the bucket that is turned upside down over the rinse fountain head.

18 Claims, 5 Drawing Sheets

AUTOMATED BUCKET CLEANING SYSTEM

BACKGROUND OF THE INVENTION

There are many uses for buckets, especially the 5-gallon buckets that are available from many hardware stores. These buckets are typically made of a smooth plastic material that cleans well so the buckets can be used many times for different uses. For most usage scenarios, it is relatively easy to clean these buckets by rinsing them with water as there is no issue regarding how clean or sterile such buckets are for the next uses.

There exist industries that utilize buckets for holding or processing materials in which the bucket must be as free of contamination as possible. One such industry is the flower industry. Plastic buckets are used to hold flowers and other flora until the flowers are cut and arranged and sold, keeping the flowers and other flora hydrated and fresh. After the flowers and other flora are removed from the bucket, it is important that the bucket be cleaned well before new flowers are stored in that bucket so as to not transfer microbes to the next set of flowers and flora that will be stored in that bucket. If left uncleaned, bacteria will grow in the water that is added when new flowers are stored in the bucket and the bacteria will harm the new, fresh cut flowers in these buckets and will cause unpleasant odors.

In the floral industry, a cleaning mixture is typically placed in the bucket, the inside cleaned with a brush or sponge, the cleaning mixture dumped out, then several iterations of rinsing the bucket, all taking several minutes, maybe 20-30 seconds for a skilled and motivated worker. For an average sized florist, based upon the flower sales, a large number of buckets (e.g., 100 to 500 buckets) must be cleaned each week. The time it takes to manually clean 100 buckets with a manual process is therefore around 2-5 hours of boring and tedious work. It is known that many workers, given a tedious assignment, will eventually skip corners and some buckets may not get fully cleaned or rinsed, leading to potential contamination of new water added to buckets and, therefore, to new flowers placed in the buckets. Unfortunately, any contaminated flowers will not stay fresh for long, leading to unhappy customers and florist reputation issues.

What is needed is an automated bucket cleaner that will increase the efficiency and thoroughness of cleaning these buckets.

SUMMARY OF THE INVENTION

In one embodiment, a system for cleaning buckets is disclosed including a cleaning mixture dispenser for placing a cleaning mixture within a bucket and a washing station. The washing station has a moving brush (e.g., rotating) for abrading an inside surface of the bucket and for spreading the cleaning mixture across the inside surface of the bucket. A rinsing fountain is provided for spraying water over the inside surface of the bucket to rinse of the cleaning mixture when the bucket is turned upside down over the rinsing fountain.

In another embodiment, a system for cleaning buckets is disclosed including a cleaning mixture dispenser for placing a cleaning mixture within the bucket. The cleaning mixture dispenser includes a source of flowing water that is interfaced to a foot-operated valve such that operation of the foot-operated valve causes water to flow through a tube for placement into the bucket. A source of cleaning fluid is interfaced to the tube such that during operation of the foot-operated valve, the cleaning fluid is inserted into the tube and mixed with water for placement into the bucket. A washing station is provided and has a brush for abrading an inside surface of the bucket and for spreading the cleaning mixture across the inside surface of the bucket. The washing station has a motor that is operatively coupled to the brush for rotating the brush and a foot-operated switch that controls power that is provided to the motor. A rinsing fountain is configured to spray water over the inside surface of the bucket to rinse the cleaning mixture. The rinsing fountain is interfaced to the source of flowing water through a second foot-operated valve such that operation of the second foot-operated valve causes water to flow through a rinse fountain feed tube and out of the rinse fountain head through orifices in the rinse fountain head for spraying onto the inside surfaces of the bucket that is turned upside down over the rinse fountain head and held within a rinse capture base that is sized to accommodate an open end of the bucket.

In another embodiment, a method of cleaning a bucket using the above system is disclosed including holding the bucket under the cleaning mixture dispenser and operating the foot-operated valve such that a cleaning mixture from the cleaning mixture dispenser is inserted into the tube for placement into the bucket. Next, holding the bucket within the washing station and moving the bucket as needed such that the brush abrading an inside surface of the bucket and spreading the cleaning mixture across the inside surface of the bucket while operating a foot-operated switch such that when the foot-operated switch is operated, power is provided to the motor causing the motor to turn and the brush to turn, and next, placing the bucket upside down over the rinsing fountain such that the bucket is held within the rinse capture base and operating the second foot-operated valve, thereby causing water to flow through a rinse fountain feed tube and out of the rinse fountain head through orifices in the rinse fountain head and onto the inside surfaces of the bucket.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
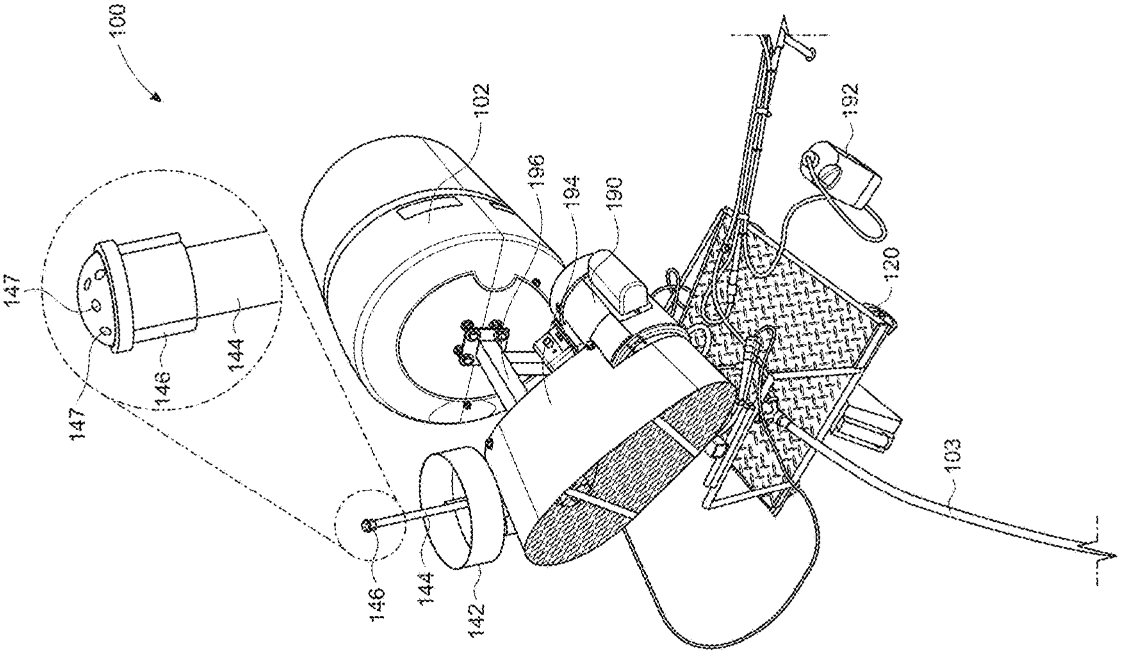
FIG. 1 illustrates a rear perspective view of an embodiment of the automated bucket cleaning system.

Reference will now be made in detail to the presently preferred embodiments of the invention, examples of which are illustrated in the accompanying drawings. Throughout the following detailed description, the same reference numerals refer to the same elements in all figures.

FIG. 1 illustrates a rear perspective view of an embodiment of the automated bucket cleaning system 100. Note that the perspective views of FIGS. 1-4 are exemplary implementations of the automated bucket cleaning system 100 and other implementations are fully anticipated using the same or different materials and supplies.

In the rear perspective view of the automated bucket cleaning system 100, the drive system of the washing station 189 and parts of the rinse fountain 140 are visible. A motor-driven cleaning mechanism distributes a cleaning mixture that is within a bucket 200 across inner surfaces of the bucket 200 (bucket that is being cleaned) while rubbing or brushing off contaminates from those surfaces. As shown in FIGS. 2-5, the washing station 189 includes a washing brush 110 (or any known washing device such as a sponge, cloth, cloth strips, mop head . . . ). The washing brush 110 is affixed at an end of a brush drive axle 112 (e.g., bolted or screwed to the end of the brush drive axle 112) such that when the brush drive axle 112 rotates, so does the washing brush 110, causing the washing brush 110 to contact surfaces of the bucket 200 for abrading soiled areas and contamination and spreading the cleaning fluid across the inside surfaces of the bucket 200. In some embodiments, the brush drive axle 112 passes within a drive axle guard 196 to reduce the possibility of a user coming into contact with the brush drive axle 112 during operation. In some embodiments, a washing shroud 102 that is sized slightly larger (slightly larger diameter) than the bucket 200 surrounds the washing brush 110 to reduce splatter and for safety reasons. During washing, the bucket 200 is positioned around the washing brush 110 and within the washing shroud 102 so that the washing brush 110 contacts a inside surface of the bucket 200. In some cases, the bucket is moved in/out, up/down, and/or left/right within the washing shroud 102 so that the washing brush 110 contacts as much internal surface area of the bucket 200 as possible.

A brush pulley 193 (covered by a safety shroud 194 in FIG. 1) is affixed to a distal end of the brush drive axle 112 such that rotation of the brush pulley 193 causes rotation of the brush drive axle.

A motor 190 provides rotation to the washing station. Power to the motor is provided from a motor power source 199 (see FIG. 5) and is intermittently controlled by a motor foot switch 192 such that activation of the motor foot switch 192 initiates operation of the motor 190. A shaft of the motor 190 has a motor pulley 195 (covered by a safety shroud 194 in FIG. 1) that rotates with the shaft of the motor 190. A belt 191 (or chain or other coupling mechanism such as gears or a direct drive, also covered by a safety shroud 194 in FIG. 1) interfaces rotation of the motor pulley 195 to the brush pulley 193, converting rotational speed (e.g., RPM) as needed to provide a certain rotational speed of the washing brush 110 with respect to the operating rotational speed of the motor 190. The brush pulley 193 is rotationally coupled to the brush drive axle 112, for rotating the washing brush 110. In some embodiments, the brush drive axle 112 passes within a drive axle guard 196 as visible in FIG. 1.

The rinse fountain 140 is partially visible in FIG. 1. The rinse fountain 140 rinses the cleaning mixture from the inside surfaces of the bucket 200. The water supply hose 103 feeds water to the rinse fountain water supply 141 (see FIG. 5) that is connected to the rinse fountain feed tube 144 through a rinse fountain foot pedal valve 152 (or any known valve in the industry, including an electrically controlled valve also not visible in FIG. 1). Operation of the rinse fountain foot pedal valve 152 causes water to flow through the rinse fountain feed tube 144 and out of the rinse fountain head 146 through orifices 147 for spraying onto the inside surfaces of the bucket 200. A rinse capture base 142 is preferably sized to encircle the open end of the bucket 200 during the rinse process, thereby capturing water and contaminates that are rinsed off of the inside surfaces of the bucket 200 during rinsing.

In some embodiments, the cleaning mixture dispenser 165, the washing station 189 and the rinse fountain 140 are mobile, interfaced to a platform 120 that, in some embodiments, has optional wheels 121 (see FIG. 4) for relocating/storage between uses.

Figure 2:
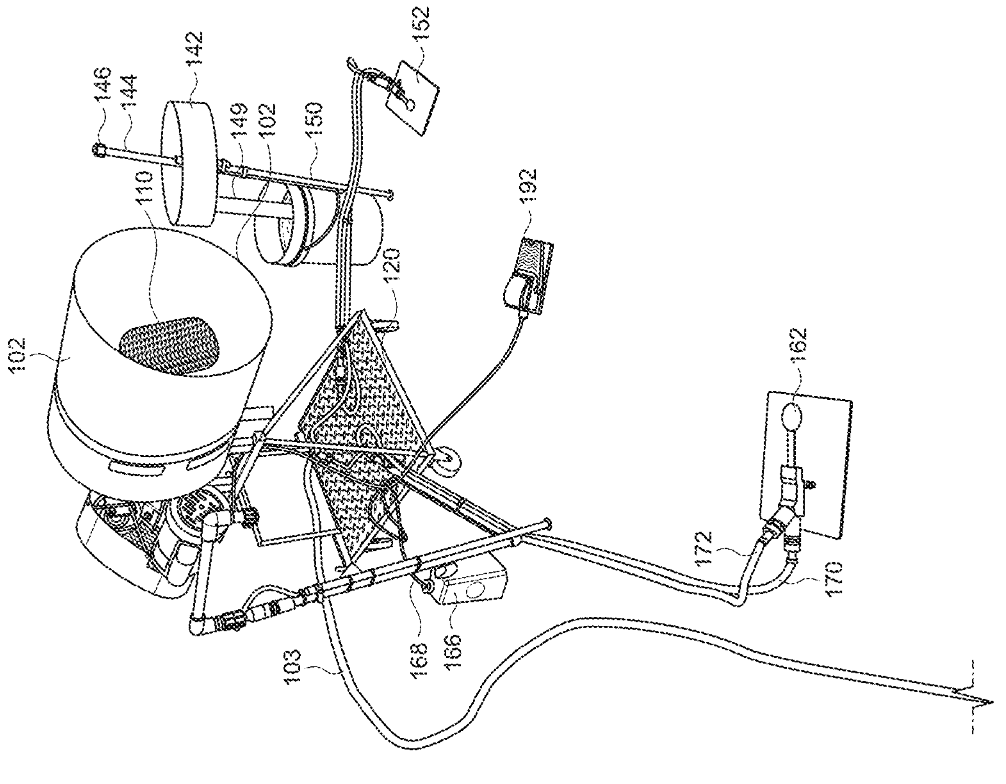
FIG. 2 illustrates a front perspective view of an embodiment of the automated bucket cleaning system.

FIG. 2 illustrates a front perspective view of an embodiment of the automated bucket cleaning system 100. In this view, the washing brush 110 is visible. The washing brush rotates when the motor foot switch 192 is operated to initiate power to the motor 190.

In FIG. 2, the cleaning mixture dispenser is visible with cleaning fluid reservoir 166 and cleaning fluid siphon tube 168. Operation of the cleaning mixture foot pedal valve 162 causes water to flow and get mixed with cleaning solution for adding a sufficient amount of the cleaning solution to the bucket 200.

The rinse fountain 140 is supported by a support 150. Water flow into the rinse fountain 140 is controlled by a rinse fountain foot pedal valve 152. Operation of the rinse fountain foot pedal valve 152 causes water to flow through the rinse fountain feed tube 144 and out of the rinse fountain head 146 to rinse the inside surfaces of the bucket that was just cleaned with cleaning solution by the washing brush 110. During rinsing, the open end of the bucket 200 fits within the rinse capture base 142 and any liquids and contaminants exit the rinse capture base 142 through the rinse fountain drain 149, shown being collected in a drain bucket, though any proper disposal of the liquids and contaminants is anticipated.

In use, during cleaning and after inserting an amount of cleaning solution into the bucket 200, the open end of the bucket 200 is inserted into the washing shroud 102 and around the washing brush 110 and, in some embodiments, the operator repositions the bucket 200 to improve contact between the washing brush 110 and all inside surfaces of the bucket 200 to assure the brush cleans all inside surfaces.

Figure 3:
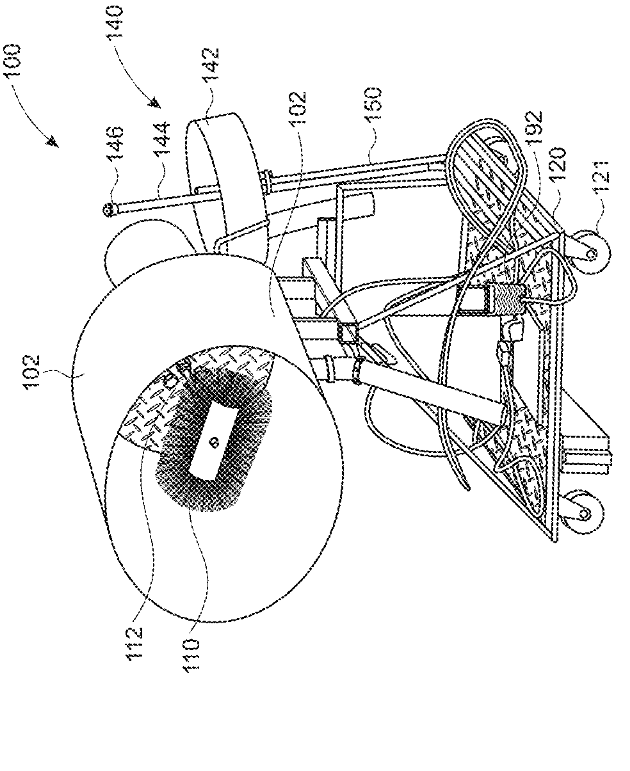
FIG. 3 illustrates a front perspective view of the cleaning and rinsing stations of an embodiment of the automated bucket cleaning system.

FIG. 3 illustrates a front perspective view of the cleaning and rinsing stations of an embodiment of the automated bucket cleaning system 100. In this, the brush drive axle 112 is partially visible and the washing brush 110 is removably affixed to an end of the brush drive axle 112, for example, by a screw or other fastener. Also, in this view, optional wheels 121 are shown interfaced to the platform 120 for making it easier to relocate the automated bucket cleaning system 100.

Figure 4:
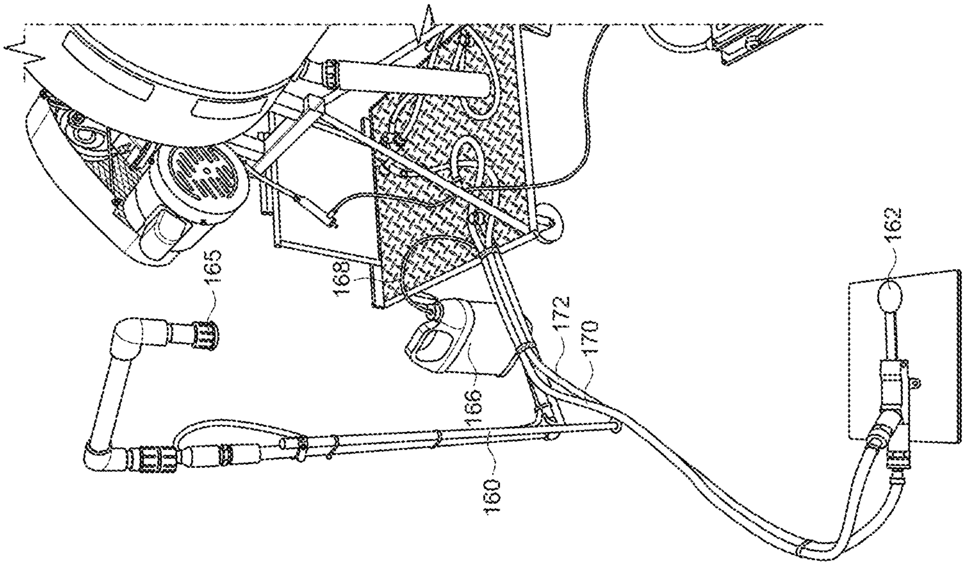
FIG. 4 illustrates a front perspective view of the cleaning mixture dispenser of an embodiment of the automated bucket cleaning system.

FIG. 4 illustrates a front perspective view of the cleaning mixture dispenser 165 of an embodiment of the automated bucket cleaning system 100. The cleaning of a bucket 200 starts with inserting an amount of cleaning mixture (e.g., water and a cleaning fluid such as soap or a disinfectant) into the bucket 200. The cleaning mixture dispenser 165 delivers this cleaning mixture under control of a cleaning mixture foot pedal valve 162. Operation of the cleaning mixture foot pedal valve 162 causes water to flow from the cleaning water supply 170 through a cleaning fluid input tube 172 and the water is mixed with a cleaning fluid (e.g., soap or a disinfectant). As the water flows through the cleaning fluid input tube 172, the water is mixed with a cleaning fluid (e.g., soap or a disinfectant). Although there are many ways to mix flowing water with cleaning fluid known in the industry, the example shown includes a cleaning fluid reservoir 166 that has a cleaning fluid siphon tube 168 that is connected to the cleaning fluid input tube 172.

Figure 5:
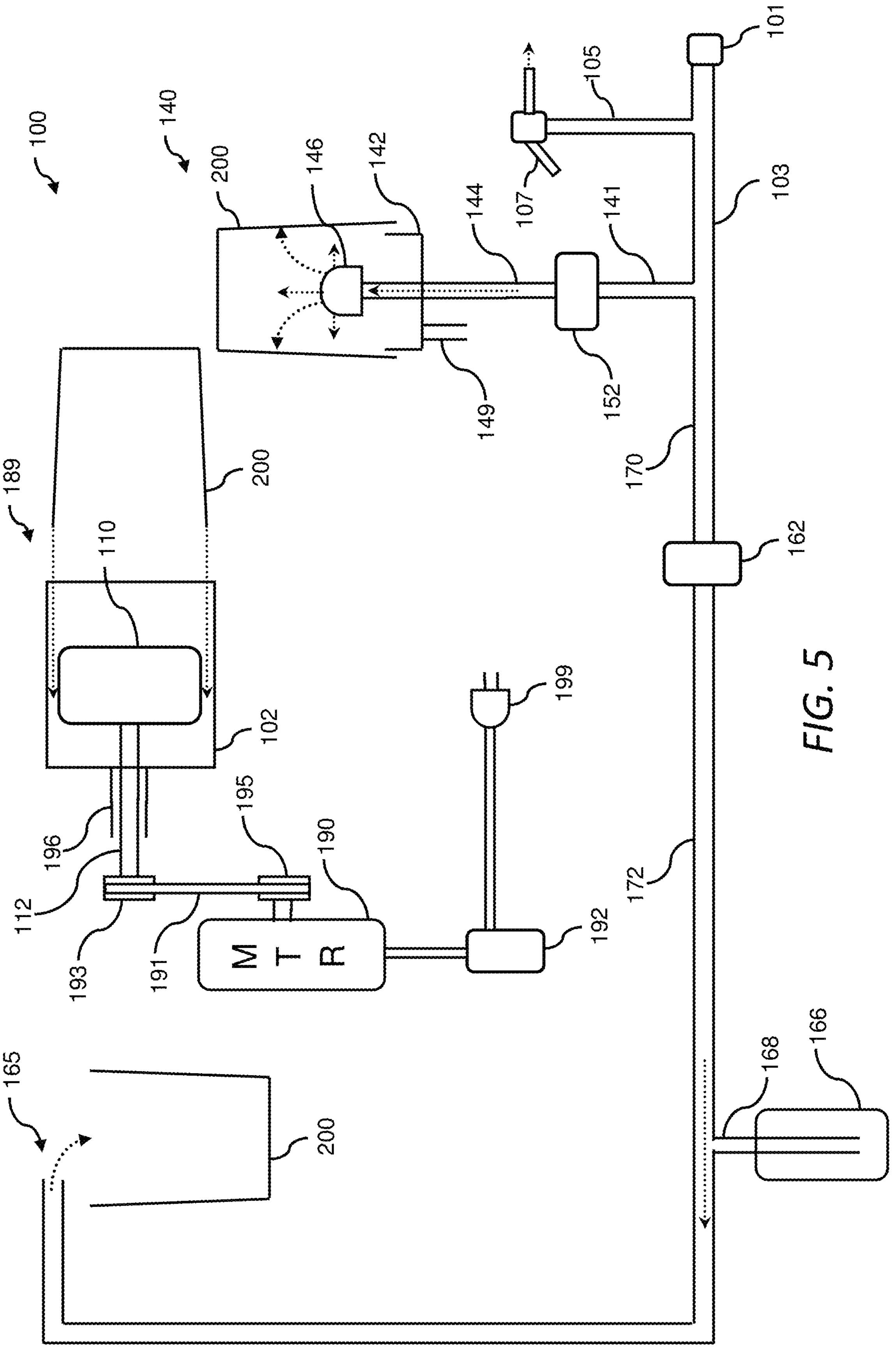
FIG. 5 illustrates a schematic view of an automated bucket cleaning system.

Referring to FIG. 5, a schematic view of an automated bucket cleaning system 100 is shown.

The automated bucket cleaning system 100 includes three stations, a cleaning mixture dispenser 165, a washing station 189, and a rinse fountain 140. The cleaning mixture dispenser 165 provides a cleaning mixture (e.g., soap and water or a disinfectant and water) into the bucket 200 (bucket that is being cleaned). The washing station 189 provides a motor-driven cleaning mechanism that distributes the cleaning mixture across surfaces of the bucket 200 (bucket that is being cleaned) while rubbing or brushing off contaminates from those surfaces. The rinse fountain 140 thoroughly rinses the cleaning mixture from the surfaces of the bucket 200.

Water is supplied from a water supply 101 through a water supply hose 103.

The cleaning mixture dispenser 165 provides a cleaning mixture (e.g., soap and water or a disinfectant and water) into the bucket 200 (bucket that is being cleaned). The water supply hose 103 is connected to the cleaning water supply 170 which is connected to a cleaning mixture foot pedal valve 162 (or any known valve in the industry, including an electrically controlled valve). Therefore, water is prevented from flowing to the cleaning mixture dispenser 165 until the cleaning mixture foot pedal valve 162 is operated, at which time, water flows through a cleaning fluid input tube 172 and the water is mixed with a cleaning fluid (e.g., soap or a disinfectant). Although there are many ways to mix flowing water with cleaning fluid known in the industry, the example shown includes a cleaning fluid reservoir 166 that has a cleaning fluid siphon tube 168 that is connected to the cleaning fluid input tube 172. In this example, as water passes through the cleaning fluid input tube 172, a suction is exerted on the cleaning fluid siphon tube 168, causing an amount of cleaning fluid to flow from the cleaning fluid reservoir 166, through the cleaning fluid siphon tube 168 to be mixed with the flowing water in the cleaning fluid input tube for insertion into the bucket 200.

The washing station 189 provides a motor-driven cleaning mechanism that distributes the cleaning mixture across surfaces of the bucket 200 (bucket that is being cleaned) while rubbing or brushing off contaminates from those surfaces. The washing station 189 includes a washing brush 110 (or any known washing device such as a sponge, cloth, cloth strips, mop head . . . ). The washing brush 110 is affixed at an end of a brush drive axle 112 (e.g., bolted or screwed to the end of the brush drive axle 112) such that when the brush drive axle 112 rotates, so does the washing brush 110, causing the washing brush 110 to contact surfaces of the bucket 200 for removing soiled areas and contamination and spreading the cleaning fluid across the inside surfaces of the bucket 200. In some embodiments, the brush drive axle 112 passes within a drive axle guard 196 to reduce the possibility of a user coming into contact with the brush drive axle 112 during operation. In some embodiments, a washing shroud 102 that is sized slightly larger than the bucket 200 surrounds the washing brush 110 to reduce splatter and for safety reasons. During washing, the bucket 200 is positioned around the washing brush 110 and within the washing shroud 102 so that the washing brush 110 contacts a inside surface of the bucket 200. In some cases, the bucket is moved in/out, up/down, and/or left/right within the washing shroud 102 so that the washing brush 110 contacts as much internal surface area of the bucket 200 as possible.

A brush pulley 193 is affixed to a distal end of the brush drive axle 112 such that rotation of the brush pulley 193 causes rotation of the brush drive axle.

A motor 190 provides rotation to the washing station. Power to the motor is provided from a motor power source 199 and is intermittently controlled by a motor foot switch 192 such that activation of the motor foot switch 192 initiates operation of the motor 190. A shaft of the motor 190 has a motor pulley 195 that rotates with the shaft of the motor 190. A belt 191 (or chain or other coupling mechanism such as gears or a direct drive) interfaces rotation of the motor pulley 195 to the brush pulley 193, converting rotational speed (e.g., RPM) as needed to provide a certain rotational speed of the washing brush 110 with respect to the operating rotational speed of the motor 190.

The rinse fountain 140 rinses the cleaning mixture from the surfaces of the bucket 200. The water supply hose 103 feeds water to the rinse fountain water supply 141 that is connected to the rinse fountain feed tube 144 through a rinse fountain foot pedal valve 152 (or any known valve in the industry, including an electrically controlled valve). Operation of the rinse fountain foot pedal valve 152 causes water to flow through the rinse fountain feed tube 144 and out of the rinse fountain head 146 for spraying onto the inside surfaces of the bucket 200.

The method of cleaning a bucket 200 includes placing the bucket upright under the cleaning mixture dispenser 165 and operating the cleaning mixture foot pedal valve 162 to place an amount of cleaning mixture into the bucket 200. Next the bucket is placed within the washing shroud 102 and the motor foot switch 192 is operated to initiate rotation of the washing brush 110 while the bucket 200 is moved around to contact most of the inside surfaces of the bucket 200 with the washing brush 110. Next, the bucket 200 is placed upside down within the rinse capture base 142 and the rinse fountain foot pedal valve 152 is operated to initiate rinsing of the inside surfaces of the bucket 200. A garden hose may now be used to rinse the outside surfaces of the bucket 200 if needed.

As the outside surface of the bucket 200 often gets soiled or contaminated with cleaning mixture, it is desirable to rinse the outside surface of the bucket 200 with water. Therefore, in some embodiments, a rinse hose 105 is fluidly interfaced to the water supply hose 103. The rinse hose 105 terminates with a rinse nozzle 107. Operating the rinse nozzle 107 emits water for rinsing the outside surface of the bucket 200.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A system for cleaning buckets, the system comprising:
   - a cleaning mixture dispenser for placing a cleaning mixture within a bucket of the buckets;
   - a washing station, the washing station having a moving brush for abrading an inside surface of the bucket and for spreading the cleaning mixture across the inside surface of the bucket;

a rinsing fountain, the rinsing fountain comprising a source of flowing water and a foot-operated valve, the source of flowing water is interfaced to the foot-operated valve such that operation of the foot-operated valve causes the water to flow through a rinse fountain feed tube and out of a rinse fountain head through orifices in the rinse fountain head for spraying onto inside surfaces of the bucket; and the rinsing fountain further comprising a rinse capture base, the rinse capture base sized to accommodate an open end of the bucket when the bucket is turned upside down over the rinse fountain head for capturing the water, the cleaning mixture, and contaminates from the inside surfaces of the bucket;

wherein the rinsing fountain is configured to spray water over the inside surface of the bucket to rinse of the cleaning mixture.

2. The system of claim 1, further comprising a foot-operated valve and a tube wherein the cleaning mixture dispenser comprises a source of flowing water interfaced to the foot-operated valve such that operation of the foot-operated valve causes the water to flow through the tube for placement into the bucket.

3. The system of claim 2, wherein the cleaning mixture dispenser further comprises a source of cleaning fluid interfaced to the tube such that during operation of the foot-operated valve the cleaning fluid is inserted into the tube for the placement into the bucket.

4. The system of claim 3, wherein the cleaning fluid is liquid soap.

5. The system of claim 1, wherein the washing station comprises a motor, and the motor is operatively coupled to the moving brush for rotating the moving brush.

6. The system of claim 5, wherein the washing station further comprises a foot-operated switch, the foot-operated switch providing power to the motor when the foot-operated switch is operated.

7. The system of claim 5, wherein the washing station further comprises a shroud, the shroud having a diameter larger than a diameter of the bucket, the shroud reducing splattering by the moving brush.

8. The system of claim 5, further comprising a coupling between the motor and the moving brush wherein the washing station further comprises a safety shroud housing, the safety shroud housing covering the coupling.

9. The system of claim 1, wherein the rinsing fountain further comprises a rinse fountain drain, wherein the rinse fountain drain is fluidly interfaced to the rinse capture base for removal of the water, the cleaning mixture, and the contaminates.

10. A system for cleaning buckets, the system comprising:

a cleaning mixture dispenser for placing a cleaning mixture within a bucket of the buckets, the cleaning mixture dispenser comprising a source of flowing water, a foot-operated valve, a tube, and a source of cleaning fluid; the source of the flowing water interfaced to the foot-operated valve such that operation of the foot-operated valve causes water to flow through the tube for placement into the bucket and the source of cleaning fluid that is interfaced to the tube such that during operation of the foot-operated valve, the cleaning fluid is inserted into the tube for the placement into the bucket;

a washing station, the washing station having a brush for abrading an inside surface of the bucket and for spreading the cleaning mixture across the inside surface of the bucket, the washing station having a motor that is operatively coupled to the brush for rotating the brush and a foot-operated switch such that when the foot-operated switch is operated, power is provided to the motor; and a rinsing fountain having a second foot-operated valve, a rinse fountain feed tube, a rinse fountain head, orifices, and a rinse capture base; the rinsing fountain head spraying the water over the inside surface of the bucket to rinse of the cleaning mixture, the rinsing fountain interfaced to the source of the flowing water through the second foot-operated valve such that operation of the second foot-operated valve causes the water to flow through the rinse fountain feed tube and out of the rinse fountain head through the orifices in the rinse fountain head for spraying onto inside surfaces of the bucket that is turned upside down over the rinse fountain head and held within the rinse capture base that is sized to accommodate an open end of the bucket.

11. The system of claim 10, further comprising a cleaning fluid siphon tube and a cleaning solution reservoir and cleaning solution within the cleaning solution reservoir; wherein the source of cleaning fluid is interfaced to the tube by a first end of the cleaning fluid siphon tube and a distal, second end of the cleaning fluid siphon tube is submersed in the cleaning solution within the cleaning solution reservoir such that during operation of the foot-operated valve, the cleaning solution is drawn from the cleaning solution reservoir by siphon action and mixed with the water.

12. The system of claim 11, wherein the cleaning fluid is liquid soap.

13. The system of claim 11, wherein the cleaning fluid is disinfectant.

14. The system of claim 10, wherein the washing station further comprises a shroud, the shroud having a diameter larger than a diameter of the bucket, the shroud reducing splattering by the brush.

15. The system of claim 14, wherein the washing station further comprises a safety shroud housing and a coupling between the motor and the brush; the safety shroud housing covering the coupling.

16. A method of cleaning a bucket using the system of claim 10, the method comprising:

holding the bucket under the cleaning mixture dispenser and operating the foot-operated valve such that the cleaning mixture from the cleaning mixture dispenser is inserted into the tube for the placement into the bucket;

holding the bucket within the washing station and moving the bucket as needed such that the brush abrading an inside surface of the bucket and spreading the cleaning mixture across the inside surface of the bucket while operating the foot-operated switch such that when the foot-operated switch is operated, the power is provided to the motor causing the motor to turn and the brush to turn; and placing the bucket upside down over the rinsing fountain such that the bucket is held within the rinse capture base and operating the second foot-operated valve, thereby causing the water to flow through the rinse fountain feed tube and out of the rinse fountain head through the orifices in the rinse fountain head and onto the inside surface of the bucket.

17. The method of claim 16, wherein the cleaning fluid is liquid soap.

18. The method of claim 16, wherein the cleaning fluid is disinfectant.

* * * * *